(12) United States Patent
Schmit et al.

(10) Patent No.: US 10,057,738 B2
(45) Date of Patent: *Aug. 21, 2018

(54) CLOUD-BASED DEVICE TWINNING

(71) Applicants: AT&T Mobility II LLC, Atlanta, GA (US); AT&T INTELLECTUAL PROPERTY I, L.P., Atlanta, GA (US)

(72) Inventors: Edward G. Schmit, Seattle, WA (US); Jayanta Das, Morganville, NJ (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/636,456

(22) Filed: Jun. 28, 2017

(65) Prior Publication Data

US 2017/0303104 A1    Oct. 19, 2017

Related U.S. Application Data

(63) Continuation of application No. 14/536,418, filed on Nov. 7, 2014, now Pat. No. 9,723,462.

(51) Int. Cl.
*H04M 3/42* (2006.01)
*H04W 4/16* (2009.01)
(Continued)

(52) U.S. Cl.
CPC .......... *H04W 4/16* (2013.01); *H04M 3/543* (2013.01); *H04W 4/14* (2013.01)

(58) Field of Classification Search
CPC .......... H04W 4/16; H04W 4/64; H04M 3/543
(Continued)

(56) References Cited

U.S. PATENT DOCUMENTS 5,327,488 A    7/1994    Garland
5,329,578 A    7/1994    Brennan et al.
(Continued)

FOREIGN PATENT DOCUMENTS

EP    1414258 A1    4/2004
EP    0897632 B1    8/2006
(Continued)

OTHER PUBLICATIONS

Taivalsaari, et al, "Cloudberry: An HTML5 Cloud Phone Platform for Mobile Devices," IEEE Software (Jul.-Aug. 2012) 29(4) pp. 40-45.
(Continued)

*Primary Examiner* — William Nealon
(74) *Attorney, Agent, or Firm* — Amin, Turocy & Watson, LLP

(57) ABSTRACT

A network-based service is utilized to facilitate twinning of two or more communication devices associated with a subscriber account. Incoming communication is intercepted by a communication device and forwarded to a network server, which in turn transmits the incoming communication to the multiple twinned devices. In addition, identifier data associated with outgoing communication is replaced with a primary identifier (e.g., customer telephone number (CTN)) of a user's primary device or a common identifier (e.g., a mobile one number (MON)) assigned to devices associated with the user's subscriber account. Communication devices can be temporarily twinned for a defined time period, during which a common bill can be generated for the twinned devices.

20 Claims, 13 Drawing Sheets

| PRIMARY UE POWER | SECONDARY UE POWER | TWINNING STATE | INCOMING DATA DIRECTED TO CTN#1 DISPLAYED VIA... | | ID FOR DATA ORIGINATING FROM SECONDARY UE | |
|---|---|---|---|---|---|---|
| | | | SECONDARY UE | PRIMARY UE | CTN#1 | CTN#2 |
| ON | ON | ON | X | X | X | |
| ON | ON | OFF | | X | | X |
| OFF | ON | ON | X | | X | |
| OFF | ON | OFF | | CALL SENT TO VM | | X |
| ON | OFF | ON | | X | | |
| ON | OFF | OFF | | X | | |

(51) Int. Cl.
*H04M 3/54* (2006.01)
*H04W 4/14* (2009.01)

(58) Field of Classification Search
USPC .................................................... 455/417
See application file for complete search history.

(56) References Cited

U.S. PATENT DOCUMENTS

| | | | |
|---|---|---|---|
| 5,353,331 | A | 10/1994 | Emery et al. |
| 5,377,262 | A | 12/1994 | Bales et al. |
| 5,487,111 | A | 1/1996 | Slusky |
| 5,506,890 | A | 4/1996 | Gupta et al. |
| 5,519,768 | A | 5/1996 | Moquin et al. |
| 5,550,900 | A | 8/1996 | Ensor et al. |
| 5,592,541 | A | 1/1997 | Fleischer, III et al. |
| 5,764,747 | A | 6/1998 | Yue et al. |
| 5,802,160 | A | 9/1998 | Kugell et al. |
| 5,815,562 | A | 9/1998 | Iglehart et al. |
| 5,923,733 | A | 7/1999 | Binns et al. |
| 5,960,340 | A | 9/1999 | Fuentes |
| 5,963,864 | A | 10/1999 | O'Neil et al. |
| 6,064,723 | A | 5/2000 | Cohn et al. |
| 6,219,551 | B1 | 4/2001 | Hentila et al. |
| 6,393,275 | B1 | 5/2002 | Alfred |
| 6,697,638 | B1 | 2/2004 | Larsson et al. |
| 6,771,761 | B1 | 8/2004 | LaPierre |
| 6,788,772 | B2 | 9/2004 | Barak et al. |
| 6,871,064 | B1 | 3/2005 | Holt et al. |
| 7,248,686 | B2 | 7/2007 | Mahajan et al. |
| 7,369,839 | B2 | 5/2008 | Haumont et al. |
| 7,388,854 | B2 | 6/2008 | Lee et al. |
| 7,599,481 | B2 | 10/2009 | Bedingfield et al. |
| 7,680,491 | B2 | 3/2010 | Zabawskyj et al. |
| 7,764,777 | B2 | 7/2010 | Wood et al. |
| 7,869,800 | B2 | 1/2011 | Netanel et al. |
| 7,933,394 | B2 | 4/2011 | Holt et al. |
| 8,023,931 | B2 * | 9/2011 | Katz .................. H04M 3/42212 455/417 |
| 8,107,957 | B1 | 1/2012 | O'Neil et al. |
| 8,116,750 | B1 | 2/2012 | Ringen et al. |
| 8,155,299 | B2 | 4/2012 | Koch et al. |
| 8,224,334 | B1 | 7/2012 | White et al. |
| 8,244,213 | B2 | 8/2012 | Zhang |
| 8,331,963 | B1 | 12/2012 | Lin et al. |
| 8,369,311 | B1 | 2/2013 | Kirchhoff et al. |
| 8,503,646 | B1 | 8/2013 | Kirchhoff et al. |
| 8,515,505 | B1 | 8/2013 | Pattikonda |
| 8,594,287 | B2 | 11/2013 | Dolan et al. |
| 8,644,485 | B1 | 2/2014 | Vendrow et al. |
| 8,666,052 | B2 | 3/2014 | Parandekar et al. |
| 8,706,100 | B2 | 4/2014 | Booth |
| 8,718,611 | B2 | 5/2014 | Balasaygun et al. |
| 8,725,131 | B1 | 5/2014 | Kirkham et al. |
| 8,730,941 | B1 | 5/2014 | Croak et al. |
| 8,738,696 | B2 | 5/2014 | Flynn et al. |
| 8,755,775 | B2 | 6/2014 | Rabra et al. |
| 8,761,363 | B2 | 6/2014 | Rajagopalan et al. |
| 8,848,890 | B2 | 9/2014 | Gupta et al. |
| 8,861,509 | B2 * | 10/2014 | Kowalewski ........... H04L 69/08 370/310 |
| 8,862,100 | B2 | 10/2014 | Patterson et al. |
| 8,903,387 | B2 | 12/2014 | Ei-Gawady et al. |
| 8,948,358 | B1 | 2/2015 | Rangarajan et al. |
| 9,077,801 | B2 | 7/2015 | Yasrebi et al. |
| 9,118,754 | B2 | 8/2015 | Nagel et al. |
| 9,119,058 | B2 | 8/2015 | Ring et al. |
| 9,179,011 | B1 | 11/2015 | Newman |
| 9,258,427 | B2 | 2/2016 | Rahman |
| 9,332,129 | B2 | 5/2016 | Li et al. |
| 9,438,728 | B2 | 9/2016 | Schei et al. |
| 2002/0168968 | A1 | 11/2002 | Glass |
| 2003/0125072 | A1 | 7/2003 | Dent |
| 2004/0072558 | A1 | 4/2004 | Van Bosch |
| 2004/0174975 | A1 | 9/2004 | Sylvain et al. |
| 2004/0229601 | A1 | 11/2004 | Zabawskyj et al. |
| 2004/0248593 | A1 | 12/2004 | Hicks, III et al. |
| 2005/0063529 | A1 | 3/2005 | Meldrum et al. |
| 2006/0077956 | A1 | 4/2006 | Saksena et al. |
| 2006/0077957 | A1 | 4/2006 | Reddy et al. |
| 2006/0222156 | A1 | 10/2006 | Smith et al. |
| 2007/0041550 | A1 | 2/2007 | McLarty et al. |
| 2007/0105531 | A1 | 5/2007 | Schroeder, Jr. |
| 2007/0127698 | A1 | 6/2007 | Holt et al. |
| 2007/0153990 | A1 | 7/2007 | Daigle |
| 2007/0224997 | A1 | 9/2007 | Florkey et al. |
| 2008/0112393 | A1 | 5/2008 | Ho et al. |
| 2008/0207184 | A1 * | 8/2008 | Wassingbo ........... H04M 1/7253 455/417 |
| 2008/0304473 | A1 | 12/2008 | Farah |
| 2009/0088142 | A1 * | 4/2009 | Baribault ................ H04M 3/42 455/418 |
| 2009/0097631 | A1 | 4/2009 | Gisby et al. |
| 2009/0215477 | A1 | 8/2009 | Lee et al. |
| 2010/0081423 | A1 | 4/2010 | Knight |
| 2010/0088753 | A1 | 4/2010 | Ayres et al. |
| 2010/0128857 | A1 | 5/2010 | Logan |
| 2010/0177879 | A1 | 7/2010 | Liljestrand et al. |
| 2010/0203894 | A1 | 8/2010 | Xiao et al. |
| 2010/0220714 | A1 | 9/2010 | Clark et al. |
| 2011/0053574 | A1 | 3/2011 | Rice |
| 2011/0059732 | A1 | 3/2011 | Cai et al. |
| 2011/0244841 | A1 * | 10/2011 | Locker ............... H04M 3/42263 455/417 |
| 2011/0300804 | A1 | 12/2011 | Lu |
| 2012/0115451 | A1 | 5/2012 | Roka |
| 2012/0275442 | A1 | 11/2012 | Malets et al. |
| 2013/0059574 | A1 * | 3/2013 | Fighel .................... H04W 4/16 455/417 |
| 2013/0070912 | A1 | 3/2013 | Parandekar et al. |
| 2013/0102298 | A1 * | 4/2013 | Goodman ............... H04W 4/16 455/417 |
| 2013/0163738 | A1 * | 6/2013 | Jano ................... H04M 3/42263 379/201.02 |
| 2013/0171965 | A1 | 7/2013 | Schrecker |
| 2013/0247147 | A1 | 9/2013 | Pontillo et al. |
| 2013/0303133 | A1 | 11/2013 | Sansalone |
| 2014/0044249 | A1 * | 2/2014 | Brittain ................. H04M 3/563 379/204.01 |
| 2014/0089481 | A1 | 3/2014 | Verrall et al. |
| 2014/0098809 | A1 | 4/2014 | Lawson et al. |
| 2015/0024717 | A1 | 1/2015 | Kochhar et al. |
| 2015/0095477 | A1 | 4/2015 | Jung et al. |
| 2015/0120442 | A1 | 4/2015 | Ganesh et al. |
| 2015/0215747 | A1 | 7/2015 | Kemmerer, Jr. et al. |
| 2015/0245186 | A1 | 8/2015 | Park et al. |
| 2015/0312859 | A1 | 10/2015 | Lu et al. |
| 2015/0334251 | A1 | 11/2015 | Grabowich |
| 2016/0036476 | A1 | 2/2016 | Cho et al. |
| 2016/0127533 | A1 | 5/2016 | Lee et al. |
| 2016/0165446 | A1 | 6/2016 | Russo |

FOREIGN PATENT DOCUMENTS

| | | |
|---|---|---|
| EP | 1973353 A1 | 9/2008 |
| EP | 1696643 B1 | 4/2009 |
| EP | 2048863 A1 | 4/2009 |
| EP | 2166738 A1 | 3/2010 |
| EP | 2509349 A1 | 10/2012 |
| EP | 2903303 A1 | 5/2015 |
| EP | 2903303 A1 | 8/2015 |
| GB | 2252697 A | 8/1992 |
| GB | 2332816 A | 6/1999 |
| WO | 9406236 A2 | 3/1994 |
| WO | 9622000 A1 | 7/1996 |
| WO | 9901998 A1 | 1/1999 |
| WO | 2005004511 A1 | 1/2005 |
| WO | 2010005278 A1 | 1/2010 |
| WO | 2013128178 A1 | 9/2013 |

(56) References Cited

FOREIGN PATENT DOCUMENTS

| WO | 2014209236 A1 | 12/2014 |
|---|---|---|
| WO | 2016056962 A1 | 4/2016 |

OTHER PUBLICATIONS

"Google Voice," Wikipedia. [http://en.wikipedia.org/wiki/Google_Voice]. Retrieved on Sep. 17, 2014, 12 pages.
Acharya, et al, "Unleashing the power of wearable devices in a SIP infrastructure," IEEE International Conference on Pervasive Computing and Communications, Mar. 2005, p. 159-168.
Starner, "The Challenges of Wearable Computing: Part 1," IEEE Micro (Jul.-Aug. 2001) 21(4) pp. 44-52. http://www.computer.org/csdl/mags/mi/2001/04/m4044-abs.html. Retrieved on Sep. 18, 2014.
Pierce, et al., "An infrastructure for extending applications' user experiences across multiple personal devices," Proceedings of the 21st annual ACM symposium on User interface software and technology. ACM, 2008. http://www.jeffreynichols.com/papers/uist2008-pie-final.pdf. Retrieved on Sep. 18, 2014, 10 pages.
Office Action dated May 2, 2016 for U.S. Appl. No. 14/536,418, 27 pages.
Taylor et al., "Access Stimulation: Subsidizing Rural Customers with Porn, or Saving Rural Service?", The Telecommunications Policy Research Conference, Oct. 1-3, 2010, Institute for Information Policy, The Pennsylvania State University. Retrieved on Feb. 16, 2017, 28 pages.
"Call Science Adds More Operator Muscle to Enhanced Services Platform", PR Newswire, Jul. 13, 1999. [https://search.proquest.com/docview/449641804?accountid=10267]. Retrieved on Feb. 16, 2017, 2 pages.
"Oracle: UCM from Oracle, Call Sciences enables SVG provider to deliver enhanced unified messaging in UK", M2 Presswire, Feb. 10, 1999, [https://search.proquest.com/docview/446267935?accountid=10267]. Retrieved on Feb. 16, 2017, 3 pages.
"RNK Communications Introduces Phone Number Bank, a First of Its Kind Solution for Consumers Who are in Jeopardy of Losing Their Telephone Numbers". Business Wire, Jul. 16, 2007. [http://www.businesswire.com/news/home/20070716005670/en/RNK-Communications-Introduces-Phone-Number-Bank-Kind], Retrieved on Feb. 16, 2017, 2 pages.
Stutzman, Rene. "Soon, 1 Phone Number Will Be All You Need", Oct. 17, 1995. Orlando Sentinel. [http://articles.orlandosentinel.com/19951017/news/9510170199_1_sprintbellsouthmobilitysubscribers]. Retrieved on Feb. 20, 2017, 2 pages.
"AirTouch Cellular Launches One Number service", Cellular Business; Sep. 1994; 11, 9; ABI/INFORM p. 82. Retrieved on Feb. 16, 2017, 1 page.
Mandl, Alex J. "The Emerging Era of Universal PCS", AT&T Technology; Autumn 1993; 8, 3; ProQuest. Retrieved on Feb. 16, 2017, 2 pages.

"BellSouth Mobility Introduces One Number Service", PRNewsire. Feb. 29, 2000, [http://www.pmewswire.com/news-releases/bellsouth-mobility-introduces-one-number-service-72800832.html]. Retrieved on Feb. 16, 2017, 3 pages.
Jensen, Ellen. "All dressed up and nowhere to go?", Wireless Review; Mar 1, 1998; 15, 5; ABI/INFORM Collection. Retrieved on Feb. 16, 2017, 3 pages.
Silver, Pete. "Get Over Your Hangups", Home Office Computing; Apr. 1997; 15, 4; Research Library. Retrieved on Feb. 16, 2017, 2 pages.
Purdy, Kevin. "Can I use one Number For my home, work and cellphones?", Popular Science; Oct. 2009; 275, 4; Research Library. Retrieved on Feb. 16, 2017, 1 pages.
"Cisco Unified Communications Manager Features and Services Guide", Release 8.6(1). 2011. Chapter 14—"Cisco Unified Mobility". Cisco Systems Inc. Retrieved on Feb. 16, 2017, 68 pages.
"'Follow Me' Service Helps Callers Reach You at the Office, at Home or on the Road with One Phone Number", PRNewswire. Jan. 19, 2000. [http://www.verizon.com/about/news/press-releases/follow-me-service-helps-callers-reach-you-office-home-or-road-one-phone-number-0]. Retrieved on Feb. 16, 2017, 3 pages.
"Linx Communications Launches Unified Communication Service in Bay Area", PRNewswire. Mar. 3, 1999. [https://search.proquest.com/docview/449876239?accountid=10267]. Retrieved on Feb. 16, 2017, 3 pages.
"ME.net Launches Market's Most Comprehensive Unified Communications Service", PRNewswire. Nov. 20, 2000. [https://search.proquest.com/docview/449253742?accountid=10267]. Retrieved on Feb. 16, 2017, 4 pages.
"New Verizon Service Provides Universal Phone Number; Convenience of One Place to Check for Email, Voice Mail and Faxes", PRNewswire, Jan. 22, 2002. [http://www.prnewswire.com/news-releases/new-verizon-service-provides-universal-phone-number-convenience-of-one-place-to-check-for-e-mail-voice-mail-and-faxes-75581572.html]. Retrieved on Feb. 16, 2017, 4 pages.
Bray, Hiawatha. "One call rings them all . . . ", Boston Globe, Jul. 2, 2009 [http://archive.boston.com/ae/games/articles/2009/07/02/google_voice_give_you_one_number_to_ring_all_your_phones/]. Retrieved on Feb. 16, 2017, 3 pages.
"TalkPlus App: iPhone Users can have Multiple Numbers and also Offers an Interesting Option for Cheaper International Calls", iPhoneHacks, Oct. 18, 2007. [http://www.iphonehacks.com/2007/10/iphone-talkplus.html]. Retrieved on Feb. 16, 2017, 6 pages.
"Basic Call Handling", Product Description, IP Office Release 6, Feb. 16, 2010, AVAYA. Retrieved on Feb. 16, 2017, 30 pages.
Brim, Patrick. "The Advanced Intelligent Network: An Overview of Markets and Applications", Telecommunications; Dec. 1994; 28, 12; Retrieved on Feb. 16, 2017, 4 pages.
Sundelof, Erik. "AT&T Innovation Showcase: Cascade demo" Youtube video of demonstration published at [https://www.youtube.com/watch?v=oHL2Wv2Tpos], published on May 18, 2014, retrieved on Mar. 10, 2017, 99 pages (including transcript and screenshots).

* cited by examiner

| PRIMARY UE POWER | SECONDARY UE POWER | TWINNING STATE | INCOMING DATA DIRECTED TO CTN#1 DISPLAYED VIA... | | ID FOR DATA ORIGINATING FROM SECONDARY UE | |
|---|---|---|---|---|---|---|
| | | | SECONDARY UE | PRIMARY UE | CTN#1 | CTN#2 |
| ON | ON | ON | X | X | X | |
| ON | ON | OFF | X | X | X | X |
| OFF | ON | ON | | | | X |
| OFF | ON | OFF | | CALL SENT TO VM | | X |
| ON | OFF | ON | | X | | |
| ON | OFF | OFF | | X | | |

FIG. 4

CLOUD-BASED DEVICE TWINNING

CROSS-REFERENCE TO RELATED APPLICATION

This application is a continuation of, and claims priority to, U.S. patent application Ser. No. 14/536,418, filed on Nov. 7, 2014, and entitled "CLOUD-BASED DEVICE TWINNING". The entirety of the above noted application is hereby incorporated by reference herein.

TECHNICAL FIELD

The subject disclosure relates to wireless communications, e.g., to cloud-based device twinning.

BACKGROUND

As wearable devices begin to proliferate, it is common for consumers to own multiple mobile devices. For example, consumers can own a primary device, such as, a mobile phone and a secondary device, such as, a smart watch, both having respective subscriber identity modules (SIMs) with associated telephone numbers. Typically, it can get difficult to remember multiple telephone numbers associated with the different mobile devices.

Further, conventionally, primary devices and wearable devices communicate via different peer-to-peer (P2P) networks, such as, Bluetooth® and/or near field communication (NFC). Using P2P protocols, notifications, calls, and/or messages received at a primary device can be simply forwarded to the wearable device. Additionally, replies to the forwarded incoming calls/messages can be directly sent to the primary device from the wearable device via the P2P networks, for example, using a keypad/touch screen and/or voice commands.

BRIEF DESCRIPTION OF THE DRAWINGS

FIG. 4 illustrates an example record that is employed to initiate twinning and/or un-twinning of user devices.

DETAILED DESCRIPTION

Figure 1:
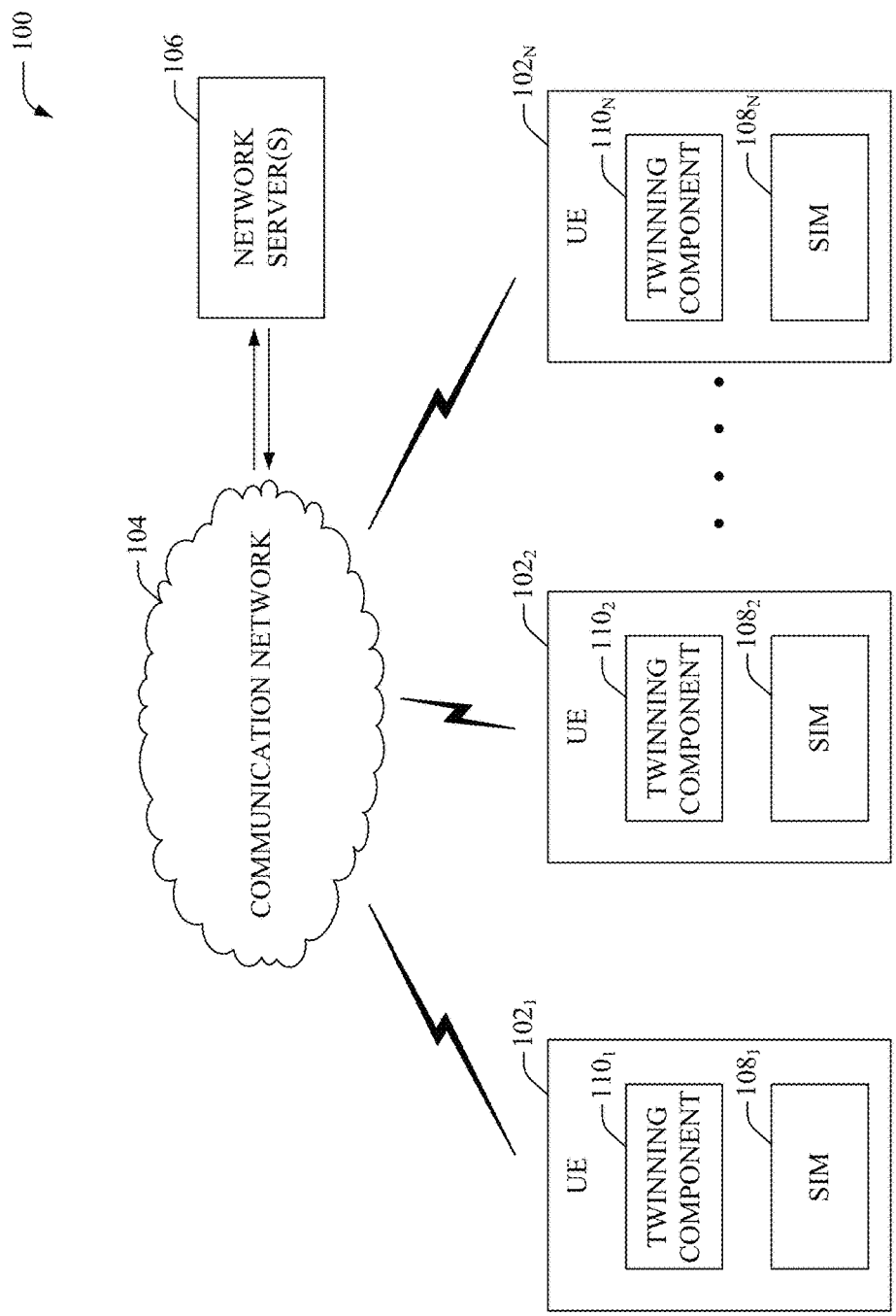
FIG. 1 illustrates an example system that provides cloud-based twinning of subscriber devices.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "server," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," "mobile equipment," "wearable device," "primary device," secondary device," "subscriber device," and similar terminology, refer to a wired or wireless device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Furthermore, the terms "user," "subscriber," "consumer," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As an example, aspects or features of the disclosed subject matter can be exploited in substantially any wired or wireless communication technology; e.g., Universal Mobile Telecommunications System (UMTS), WiFi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), ZigBee, or another IEEE 802.XX technology. Additionally, substantially all aspects of the disclosed subject matter can be exploited in legacy (e.g., wireline) telecommunication technologies and/or future telecommunication technologies (e.g., 5G, whitespace, etc.).

Systems and methods disclosed herein relate to a cloud service that enables twinning of multiple communication devices associated with a subscriber account. The term "twinning" as used herein refers to replicating communications (e.g., transmission/reception of data) on two or more communication devices. For example, when an incoming communication (call, message, and/or data) is directed to a communication device, the notification for the incoming communication will be transmitted to the communication device as well as its twinned communication device (simultaneously or substantially simultaneously), such that the incoming communication can be received via either of the communication devices. Further, systems and methods disclosed herein enable users to utilize a primary identifier (e.g., telephone number) to share voice and/or text messages and on multiple communication devices (with individual subscriber identity modules (SIMs)) associated with their subscriber account. As an example, the primary identifier can be an identifier (e.g., customer telephone number (CTN)) of a user's primary device or can be a common identifier (e.g., a mobile one number (MON)) assigned to multiple secondary devices associated with the user's subscriber account. In one aspect, incoming communication is intercepted by the primary device and forwarded to a cloud service, which in turn transmits the incoming communication to the multiple secondary devices.

Referring initially to FIG. 1, there illustrated is an example system 100 that provides cloud-based twinning of subscriber devices, according to one or more aspects of the disclosed subject matter. System 100 includes two or more user equipment (UEs) $102_1$-$102_N$ (wherein N is most any integer greater than 1) associated with (e.g., owned by, leased by, rented by, used by, etc.) a common subscriber. As an example, the UEs $102_1$-$102_N$ can include most any electronic communication devices such as, but not limited to, most any consumer electronic device, for example, a tablet computer, a cellular phone, a personal computer, a personal digital assistant (PDA), a smart phone, a laptop, a wearable device (e.g., smart watch, smart glasses, activity/fitness tracker, etc.), a digital media player, a digital camera, a content streaming player/dongle, a digital set-top box, a gaming system, etc. Further, the UEs $102_1$-$102_N$ can also include, LTE-based devices, such as, but not limited to, most any home or commercial appliance that includes an LTE radio and/or a connected vehicle (e.g., connected car, boat, plane, etc.). It can be noted that UEs $102_1$-$102_N$ can be mobile, have limited mobility and/or be stationary. In one example, UEs $102_1$-$102_N$ can include a multi-band, multi-mode, and/or multi-radio device. UEs $102_1$-$102_N$ can be coupled to a communication network 104 (e.g., cellular network, WiFi network, etc.) via one or more radio access networks (RANs) (not shown).

System 100 utilizes a cloud/network to facilitate device twinning of UEs $102_1$-$102_N$. As an example, a cloud can include resources (e.g., processing resource(s), data storage resource(s), etc.) that can reside on-premise or off-premise at a service provider location. Moreover, the cloud can be, but is not limited to, a public cloud, a private cloud, an inter-cloud, or a hybrid cloud. In one aspect, network server(s) 106 can be part of the cloud. In one aspect, UEs $102_1$-$102_N$ can include respective subscriber identity modules (SIMs) $108_1$-$108_N$ that are employed to authenticate, register, and couple the UEs $102_1$-$102_N$ with the communication network 104. Moreover, the SIMs $108_1$-$108_N$ can store respective unique identifiers assigned to the UEs $102_1$-$102_N$, such as, but not limited to, customer telephone numbers (CTNs), Mobile Station International Subscriber Directory Numbers (MSISDNs), International mobile station equipment identity (IMEI), etc. As the number of devices associated with a common subscriber account increase, the number of identifiers (e.g., CTNs) that a user and/or his friends/family need to remember/recognize increases. System 100, via network server(s) 106, allows the user and/or his friends/family to remember/recognize a single primary identifier (e.g., primary telephone number) and facilitates routing of a call or message to multiple communication devices associated with the user's subscriber account. Accordingly, system 100 enables utilization of one telephone number for all (or a selected set) of a user's devices. Moreover, when UEs $102_1$-$102_N$ are twinned and communication data (e.g., voice/video calls, text messages, application data, etc.) directed to a first unique identifier associated with a first UE (e.g., UE $102_1$) is received, the communication data can be directed to the remaining UEs (e.g., UEs $102_2$-$102_N$) via the network server(s) 106.

According to an embodiment, UEs $102_1$-$102_N$ can include respective twinning components $110_1$-$110_N$ that can be utilized to intercept the communication data received by the UEs $102_1$-$102_N$ and/or that is to be transmitted from the UEs $102_1$-$102_N$ and forward the communication data to the network server(s) 106 via the communication network 104. In one aspect, the network server(s) 106 can include an In-App messaging application programming interface (API) and/or a cloud voice API that facilitates the routing of text messages and/or voice calls, respectively. As an example, for incoming communication data, the network server(s) 106 can transmit the communication data to all the twinned devices (e.g., UEs $102_1$-$102_N$), such that the communication data can be accessed by the user via any one (or more) of the devices (e.g., UEs $102_1$-$102_N$). As another example, for outgoing communication data, the network server(s) 106 can transmit the communication data to the destination device using a primary identifier selected from the respective unique identifiers assigned to the twinned UEs $102_1$-$102_N$. In one aspect, the twinning components $110_1$-$110_N$ can include, but are not limited to, twinning applications that are installed on UEs $102_1$-$102_N$, for example, during provisioning, during manufacturing, via over-the-air signaling, on demand, etc.

Figure 2:
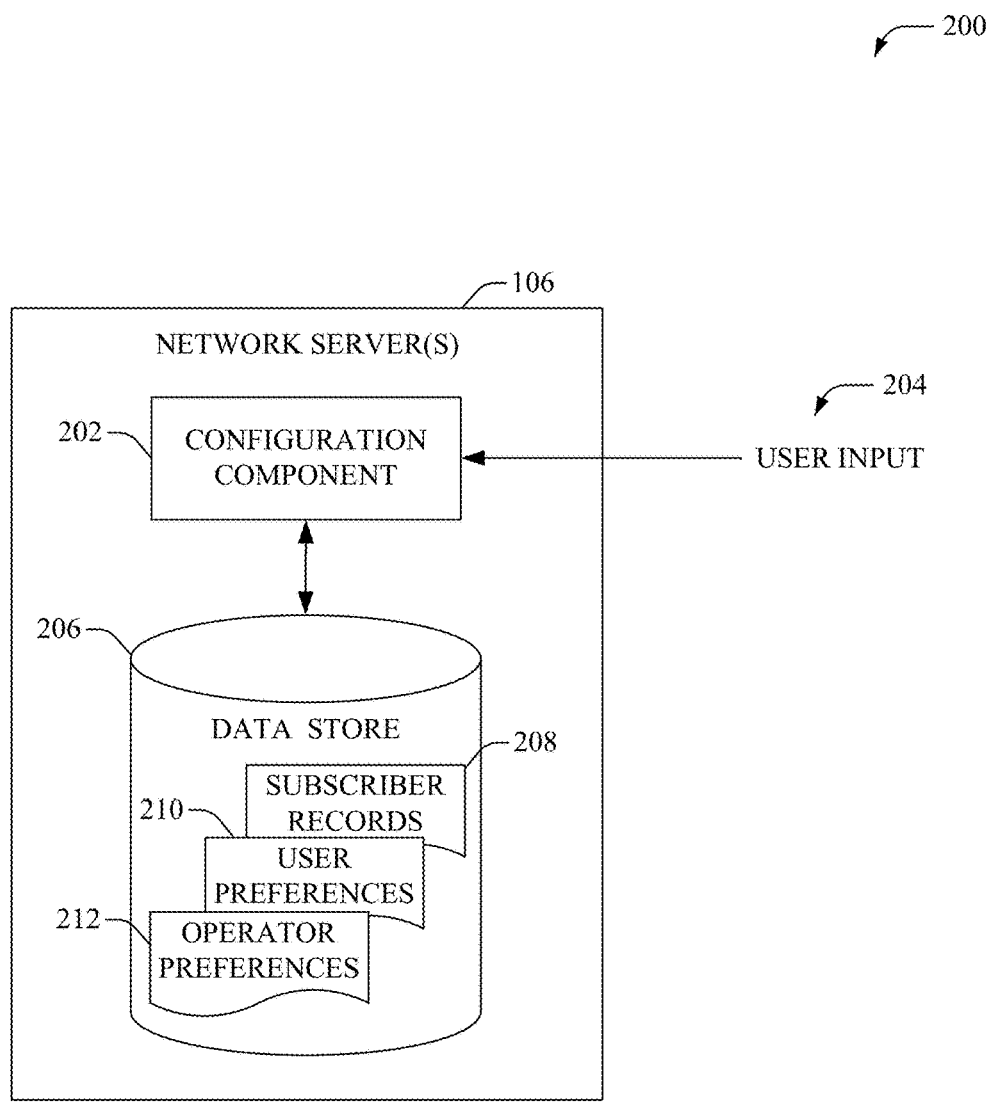
FIG. 2 illustrates an example system for configuration of twinned devices.

Referring now to FIG. 2, there illustrated is an example system 200 for configuration of twinned devices, in accordance with an aspect of the subject disclosure. In one aspect, system 200 can enable users to manage (e.g., activate and/or deactivate) twinning of their devices. It is noted that the network server(s) 106 can include functionality as more fully described herein, for example, as described above with regard to system 100.

In one aspect, the network server(s) 106 can include a configuration component 202 that can be employed for management of twinned devices associated with a user account. Moreover, the configuration component 202 can receive user input 204 that is indicative of associating or disassociating two or more devices (e.g., UEs $102_1$-$102_N$) of the user. As an example, the user input 204 can be received from one or more of the devices (e.g., UEs $102_1$-$102_N$) via an application downloaded on and/or installed on the device, and/or via a website/web server accessed by the user (e.g., via an account management webpage). It is noted that the user input can be received at most any time, such as but not limited to, on demand, on purchase/lease/rent of a new device, at a specified time, in response to detection of an event, periodically, on request, etc. Additionally or optionally, the configuration component 202 can verify that the user or user device is authorized to configure the twinned devices, for example, by employing most any authentication techniques (e.g., passwords, credentials, pins, biometric data, etc.)

According to an aspect, the user input 204 can specify identifier data indicative of devices, for which that twinning is to be initiated or discontinued. For example, the identifier data can include telephone numbers (e.g., CTNs) associated with the devices. Additionally or optionally, the user input 204 can specify timing data indicative of a time period for which the devices are to be twinned (or twinning is to be discontinued). As an example, if a user has rented a device for a specified time period, the user can request that the device be twinned with his primary device only for the duration of the time period. In another example, if the user has loaned out his secondary device (that is twinned to his primary device), the user can request that the secondary device be disassociated from his primary device (e.g., the request can be sent on initiating the loan and/or prior to loaning the secondary device). Moreover, in this example scenario, the secondary device be disassociated the primary device for the duration of the loan period. The configuration component 202 can store this user input 204 in data store 206 as subscriber records 208. It is noted that the data store 206 can include volatile memory(s) or nonvolatile memory(s), or can include both volatile and nonvolatile memory(s). Examples of suitable types of volatile and non-volatile memory are described below with reference to FIG. 13. The memory (e.g., data stores, databases) of the subject systems and methods is intended to comprise, without being limited to, these and any other suitable types of memory. Although depicted as residing completely within the network server(s) 106, it is noted that the data store 206 can reside partially within the network server(s) 106 and/or be locally (or remotely) coupled to the network server(s) 106.

Further, the user input 204 can also specify policies and/or rules for initiation or disconnection of twinning and accordingly, the configuration component 202 can populate the subscriber records 208 and/or store the policies and/or rules in the data store 206 as user preferences 210. For example, the policies/rules can be based on geographical locations of UEs, current time or date/date, type of communication (e.g., forward only voice calls but not text messages, etc.), source or destination devices from/to which communications are received/directed, message priority, message size, distance between the twinned UEs, etc. Additionally or optionally, the user input 204 can also specify a telephone number (e.g., CTN) that is to be employed while routing outgoing communications from the user's devices (e.g., UEs $102_1$-$102_N$). For example, the telephone number can be a number (e.g., CTN) associated with the user's primary device or can be the telephone number of the device that initiated the communication. Furthermore, in one example, the user input 204 can be a predefined text code (e.g., *12, *11, etc.) that can activate or deactivate twinning of all devices associated with a subscriber account. Moreover, the text code can be sent as a text message (e.g., short message service (SMS) message, multimedia messaging service (MMS) message, instant message, email, etc.) from one of the user's devices (e.g., UEs $102_1$-$102_N$) to a number associated with the cloud service/network server(s) 106. Additionally, the configuration component 202 can also receive operator preferences 212 from one or more network devices (not shown) of the communication network (e.g., communication network 104) that can be stored in the data store 206. The network server(s) 106 can analyze the information stored within the data store 206 to facilitate routing of communication directed to/received from the user's devices (e.g., UEs $102_1$-$102_N$).

Figure 3:
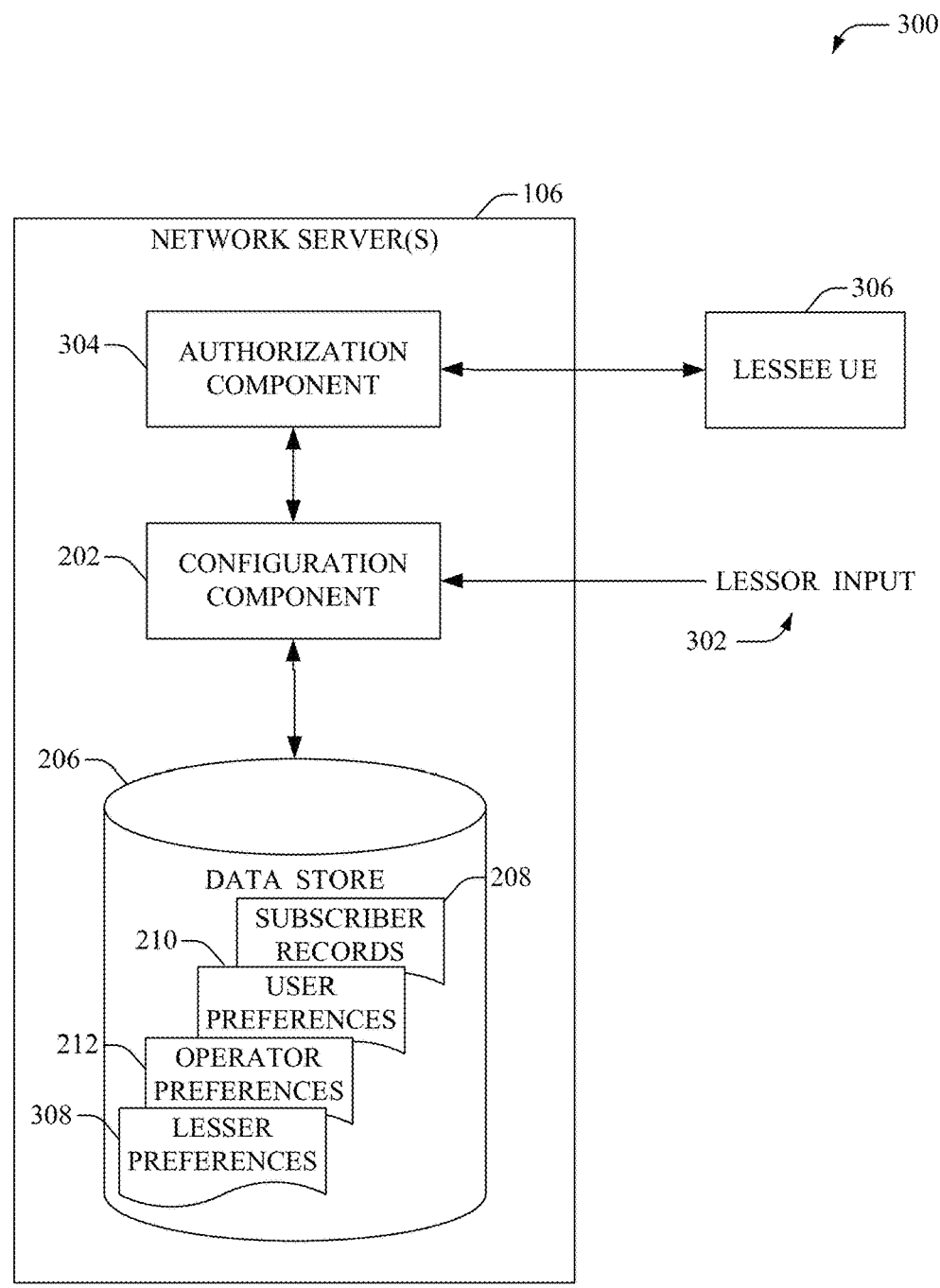
FIG. 3 illustrates an example system that facilitates temporary twinning of a leased/rented device.

Referring now to FIG. 3, there illustrated is an example system 300 that facilitates temporary twinning of a leased/rented device, according to an aspect of the subject disclosure. As an example, system 300 can be utilized for linking, to a subscriber account, mobile-connected emerging devices, which are typically used by the user for a predetermined period of time (e.g., lease term, rental time period, loan duration, etc.). The mobile-connected emerging devices can include most any UE, such as, but is not limited to a connected vehicle, rental skis/equipment, etc. Typically, the user may not own the mobile-connected emerging device but can rent, lease, and/or borrow the mobile-connected emerging device for a specified time period. System 300 enables the user and/or device owner/provider to temporarily twin the mobile-connected emerging device with the user's primary devices during the specific period. In an example, the twinning can facilitate determination of a common bill for the usage of the mobile-connected emerging device and the primary devices. It is noted that the network server(s) 106, the configuration component 202, the data store 206, the subscriber records 208, the user preferences 210, and the operator preferences 212 can include functionality as more fully described herein, for example, as described above with regard to systems 100 and 200.

In one aspect, the configuration component can receive lessor input 302 that is indicative of associating or disassociating two or more devices (e.g., UEs $102_1$-$102_N$) from a lessor (and/or renter, owner, business entity, etc.) of the leased communication device. Moreover, the lessor input 302 can be received from one or more devices via an application downloaded on and/or installed on the devices, or via a website/web server accessed by the lessor (e.g., via an account management webpage). It is noted that the lessor input 302 can be received at most any time, such as but not limited to, on demand, on purchase/lease/rent of a new device, at a specified time, in response to detection of an event, periodically, on request, etc. In an example scenario wherein a user rents a connected car, the car rental company, with the user's consent, can notify the user's primary device carrier network with the user's primary account phone number. The notification can be directed through the carrier network to the configuration component 202, which in turn can instruct an authorization component 304 to verify the user's consent to twin the user's primary device with the connected car. The authorization component 304 can utilize various authorization techniques to confirm the user's consent. For example, the authorization component 304 can transmit a consent confirmation request to the lessee's UE 306, for example, the user's primary device (e.g., UEs $102_1$-$102_N$). Moreover, the consent confirmation request can be transmitted via one or more text messages (e.g., SMS message, MMS message, instant message, email, etc.). If confirmation is not received (e.g., within a defined time period) or is rejected, the configuration component 202 can reject/block the lessor input 302 and deny twinning of devices. Alternatively, if confirmation (e.g., acknowledgement) is received from the lessee's UE 306, the configuration component 202 can twin the leased device with the user's primary device (and/or one or more secondary devices associated with the user's account).

According to an aspect, the lessor input 302 can specify identifier data indicative of devices, for which that twinning is to be initiated or discontinued. For example, the identifier data can include telephone numbers (e.g., CTNs) associated with the rental device (connected car, skiing gear, etc.). Additionally or optionally, the lessor input 302 can specify timing data indicative of a time period for which the devices are to be twinned (or twinning is to be discontinued). As an example, if a user has rented a device for a specified time period, the lessor can request that the device be twinned with the user's primary device only during that time period. The configuration component 202 can store this lessor input 302 in data store 206 as subscriber records 208. Further, the lessor input 302 can also specify policies and/or rules for initiation or disconnection of twinning and accordingly, the configuration component 202 can populate the subscriber records 208 and/or store the policies and/or rules in the data store 206 as lessor preferences 308. The network server(s) 106 can analyze the information stored within the data store 206 to facilitate routing of communication directed to/received from the user's devices, including the leased device.

At the end of the rental period or termination of the lease contract, configuration component 202 can receive a device un-twinning request from the lessor, via the lessor input 302. The authorization component 304 can verify the user's content to un-twin the user's primary device and the leased device. For example, the authorization component 304 can transmit a consent confirmation request to the lessee's UE 306, for example, the user's primary device (e.g., UEs $102_1$-$102_N$). Moreover, the consent confirmation request can be transmitted via one or more text messages (e.g., a SMS message, a MMS message, an instant message, email, etc.). If confirmation is not received (e.g., within a defined time period) or is rejected, the configuration component 202 can reject/block the lessor input 302 and deny un-twinning of devices. Alternatively, if confirmation (e.g., acknowledgement) is received from the lessee's UE 306, the configuration component 202 can un-twin the leased device from the user's primary device (and/or one or more secondary devices associated with the user's account).

Referring now to FIG. 4, there illustrated is an example record 400 that is employed to initiate twinning (or un-twinning) of user devices in accordance with the subject embodiments. As an example, record 400 can be generated by the configuration component 202 (e.g., based on the user input 204 and/or the lessor input 302) and stored in data store 206 (e.g., as a subscriber record 208). Although information regarding only two UEs (e.g., a primary UE and a secondary UE) are depicted in the record 400, it is noted that the subject specification is not limited to two UEs and multiple UEs can be associated with a subscriber account. In this example scenario, the primary UE is assigned a CTN#1 and the secondary UE is assigned a CTN#2. Record 400 depicts the rules associated with routing communication data to/from the primary UE and/or secondary UE.

As an example, when both the primary and secondary UEs are switched on, and twinning has been activated (e.g., twinning state is ON), incoming communication directed to either CTN (e.g., CTN#1 or CTN#2) is intercepted by the UE and forwarded (e.g., by the network server 106) simultaneously (or substantially simultaneously) to both the primary and secondary UEs. Further, CTN#1 that is assigned to the primary UE can be utilized for outgoing communication received from the secondary UE. Alternatively, when both the primary and secondary UEs are switched on, and twinning has been deactivated (e.g., twinning state is OFF), incoming communication directed to CTN#1 is routed (e.g., by the network server 106) only to the primary UE, while incoming communication directed to CTN#2 is routed (e.g., by the network server 106) only to the secondary UE. Since the UEs are un-twinned, outgoing communication received from the secondary UE is forwarded (e.g., by the network server 106) to the destination device with the CTN#2 that is assigned to the secondary device.

In another example, when the primary UE is switched off, the secondary UE is switched on, and twinning has been activated (e.g., twinning state is ON), incoming communication directed to either CTN (e.g., CTN#1 or CTN#2) is intercepted and forwarded (e.g., by the network server 106) to the secondary UE. Further, CTN#1 that is assigned to the primary UE can be utilized for outgoing communication received from the secondary UE. Alternatively, when the primary UE is switched off, the secondary UE is switched on, and twinning has been deactivated (e.g., twinning state is OFF), incoming communication directed to CTN#1 is routed (e.g., by the network server 106) to the primary UE's voicemail, while incoming communication directed to CTN#2 is routed (e.g., by the network server 106) only to the secondary UE. Since the devices are un-twinned, outgoing communication received from the secondary UE is forwarded (e.g., by the network server 106) to the destination device with the CTN#2 that is assigned to the secondary device.

In yet another example, when the primary UE is switched on, the secondary UE is switched off, and twinning has been activated (e.g., twinning state is ON), incoming communication directed to either CTN (e.g., CTN#1 or CTN#2) is intercepted and forwarded (e.g., by the network server 106) to the primary UE. Alternatively, when the primary UE is switched on, the secondary UE is switched off, and twinning has been deactivated (e.g., twinning state is OFF), incoming communication directed to CTN#1 is routed (e.g., by the network server 106) only to the primary UE, while incoming communication directed to CTN#2 is routed (e.g., by the network server 106) to the secondary UE's voicemail.

Figure 5:
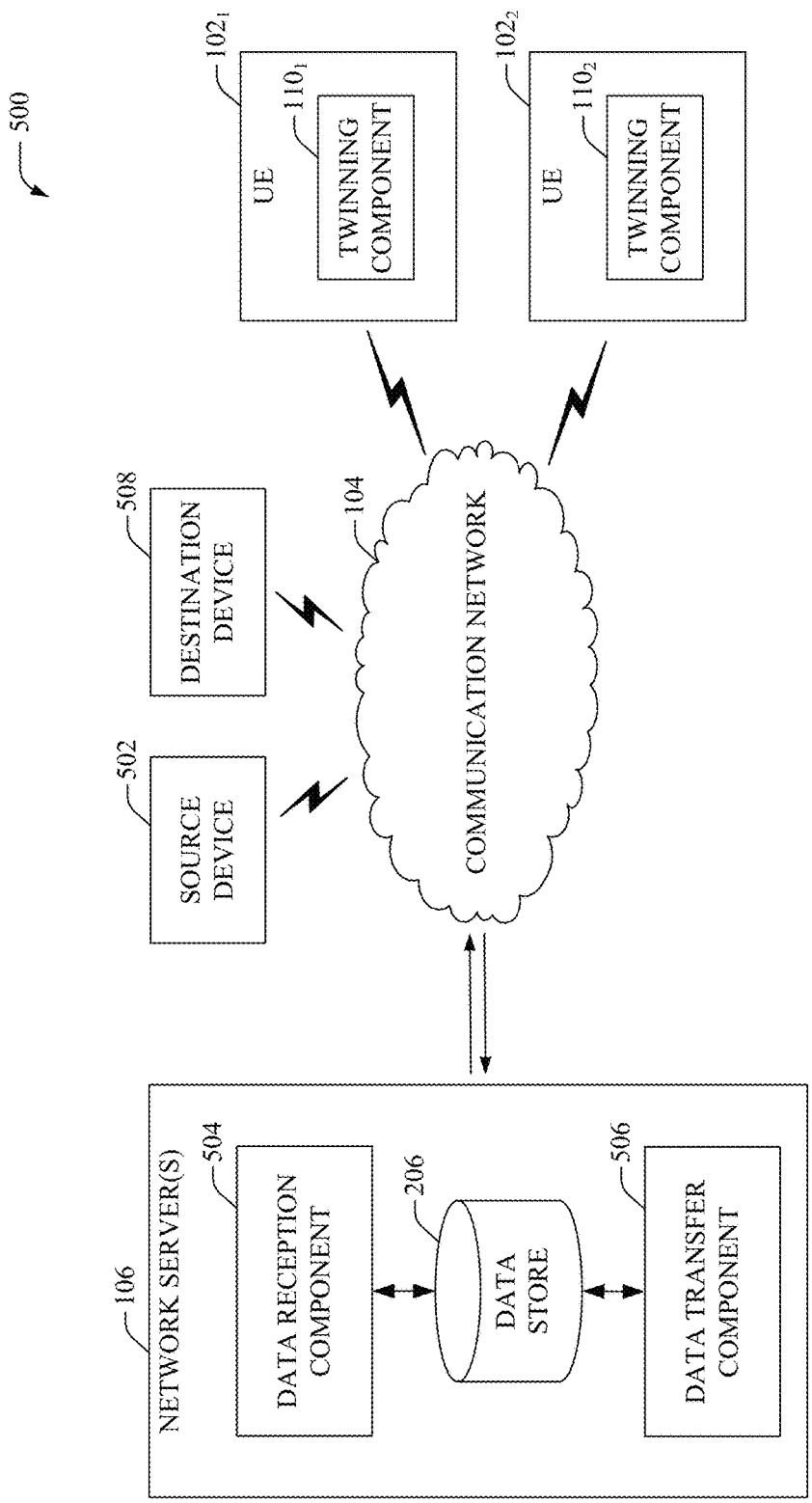
FIG. 5 illustrates an example system that facilitates routing of communication data between twinned devices.

FIG. 5 illustrates an example system 500 that facilitates routing of communication data between twinned devices, according to an aspect of the subject disclosure. As an example, system 500 can enable utilization of a common number (e.g., CTN) to route communications to/from multiple devices associated with the user's subscriber account. It is noted that the UEs $102_1$-$102_2$, the communication network 104, the network server(s) 106, the twinning components $110_1$-$110_2$, the configuration component 202, and the data store 206 can include functionality as more fully described herein, for example, as described above with regard to systems 100-300.

In this example scenario, UE $102_1$ can be considered as the user's primary device (e.g., cell phone) having a first CTN#1 and UE $102_2$ can be considered as the user's secondary device (e.g., wearable device, connected car, tablet computer, etc.) having a disparate second CTN#2. When the UEs $102_1$-$102_2$ are twinned (e.g., by employing the configuration component 202), communication data (e.g. voice/video calls, text messages, application data, etc.) transmitted by a source device 502 (e.g., another UE, content server, web server, etc.) and directed to one of the CTNs (e.g., CTN#1 or CTN#2) can be rerouted to both the UEs $102_1$-$102_2$. Alternatively, when the UEs $102_1$-$102_2$ are un-twinned (e.g., by employing the configuration component 202), the communication data transmitted from the source device 502 and directed to CTN#1, is routed to and presented via the UE $102_1$, while the communication data transmitted from the source device 502 and directed to CTN#2, is routed to and presented via the UE $102_2$.

As an example, if the source device 502 initiates a call to UE $102_1$ by employing CTN#1, the call data is directed to the UE $102_1$ via the communication network 104 and is intercepted by the twinning component $110_1$. Prior to (or at most any time) the call notification being provided to the user via UE $102_1$, the twinning component $110_1$ transmits the call data to the network server(s) 106. In one aspect, a data reception component 504 receives the call data and analyses the call data along with data stored in the data store 206 (e.g., subscriber records, user preferences, operator preferences, lessor preferences, etc.). Based on the analysis, a data transfer component 506 can transmit the call data to the appropriate devices. If determined by during the analysis that the UEs $102_1$-$102_2$ are twinned (and/or other preference criterion is satisfied), the call data can be routed simultaneously (or substantially simultaneously) to both UEs $102_1$-$102_2$ and accordingly the call notification (e.g., ring) can be presented via the UEs $102_1$-$102_2$ simultaneously (or substantially simultaneously). If the user decides to answer the call on UE $102_1$, the call is dropped on UE $102_2$, or if the user decides to answer the call on UE $102_2$, the call is dropped on UE $102_1$. However, if determined during the analysis that the UEs $102_1$-$102_2$ are not twinned (and/or other preference criterion is not satisfied), the call data can be routed only to UE $102_1$. A similar procedure is performed when the source device 502 initiates a call to UE $102_2$ by employing CTN#2, wherein the twinning component $110_2$ intercepts the received call before the call notification is presented on UE $102_2$ and transmits the call data to the data reception component 504. The data reception component 504 analyses the call data along with data stored in the data store 206 and the data transfer component 506 transmit the call data to the appropriate devices (e.g., UEs $102_1$-$102_2$).

According to an embodiment, during outgoing communications (e.g. voice/video calls, text messages, application data, etc.) from the secondary UE $102_2$, to a destination device (e.g., another UE, content server, web server, etc.), the twinning component $110_2$ intercepts the outgoing communications and redirects the communication data to the network server(s) 106. The data reception component 504 receives the communication data and analyzes the received data along with data stored in the data store 206 (e.g., subscriber records, user preferences, operator preferences, lessor preferences, etc.) Based on the analysis, the data transfer component 506 can mask and/or modify the identifier (e.g., CTN) of UE $102_2$ and transmit the communication data to the destination device 508 via the communication network 104. For example, if determined by during the analysis that the UEs $102_1$-$102_2$ are twinned, the CTN#2 of UE $102_2$ can be replaced with CTN#1 of UE $102_1$ (or a MON assigned to the subscriber account) and the data transfer component 506 can transmit the communication data with the modified CTN to the destination device 508. However, if determined by during the analysis that the UEs $102_1$-$102_2$ are not twinned, the data transfer component 506 can transmit the communication data with the original CTN, CTN#2, to the destination device 508. In another example embodiment, the twinning component $110_2$ can reroute intercepted outgoing communications directly to the primary UE $102_1$, for example, via the communication network and/or one or more peer-to-peer network links (e.g., Bluetooth®, WiFi direct, near field communication (NFC), etc.). Further, the twinning component $110_1$ of the UE $102_1$ can replace the identifier (e.g., CTN#2) of UE $102_2$ received in the communication data with the identifier (e.g., CTN#1) of UE $102_1$ and transmit the communication data to the destination device 508 via the communication network 104. Accordingly, a single CTN can be utilized for multiple twinned UEs associated with a common subscriber account to simplify billing and/or caller identification.

Figure 6:
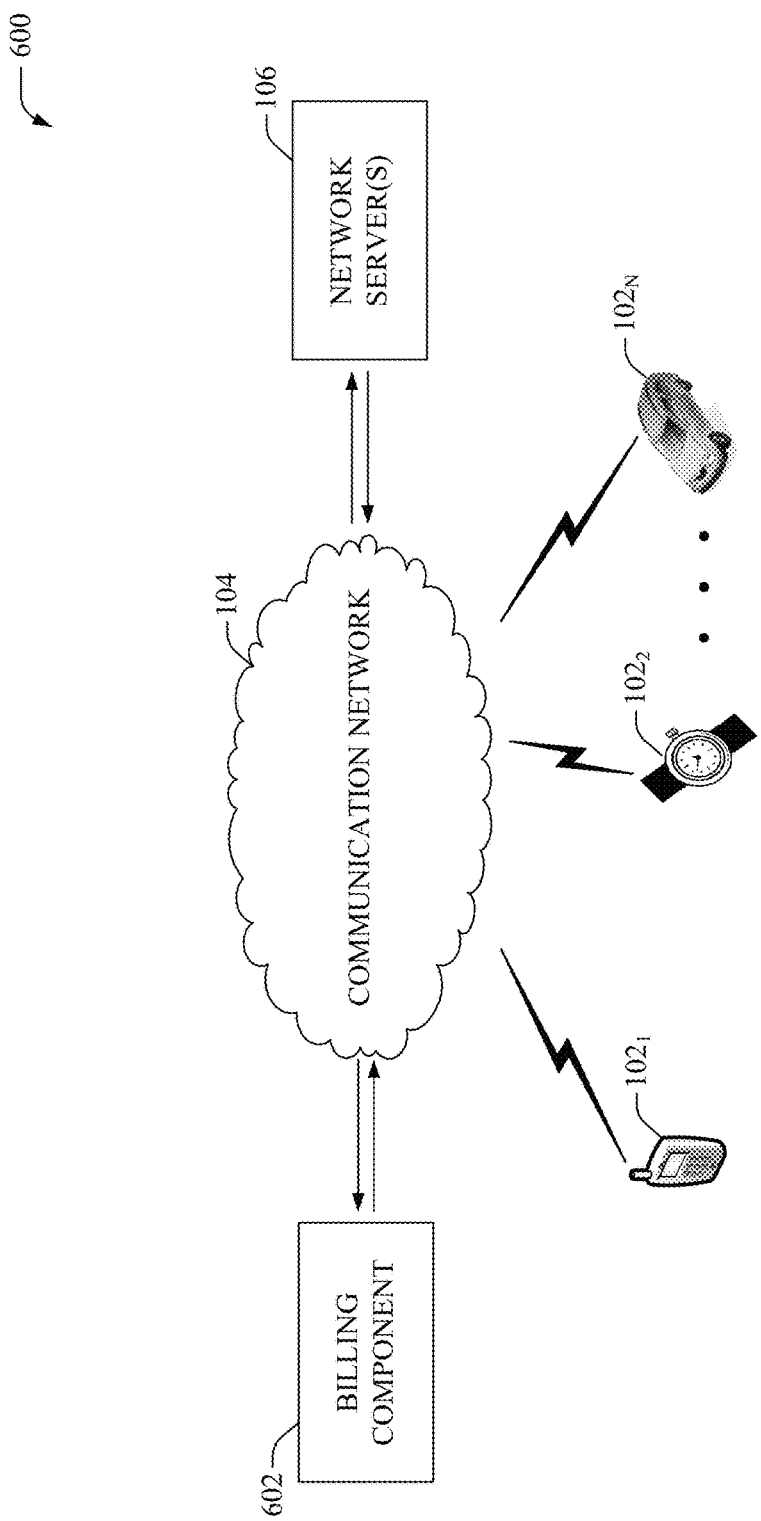
FIG. 6 illustrates an example system that facilitates billing for twinned devices.

Referring now to FIG. 6, there illustrated is an example system 600 that facilitates billing for twinned devices, according to one or more aspects of the disclosed subject matter. It can be noted that the UEs $102_1$-$102_N$, the communication network 104, and the network server(s) 106 can include functionality as more fully described herein, for example, as described above with regard to systems 100-500. In one aspect, the billing component 602 can monitor communications transmitted via the communication network 104. Based on the various factors, such as, but not limited to, destination device identifier, source device identifier, bandwidth, speed, amount of data transmitted, time of day, etc., the billing component 602 can apply operator-defined charges and generate a bill for network usage. Moreover, for twinned devices that utilize the same identifier (e.g., primary CTN or MON), a common bill for network usage by the multiple twinned devices can be generated by the billing component 602. Moreover, for temporarily utilized (e.g., rented, leased, borrowed) devices, such as, but not limited to a smart watch (e.g., UE $102_2$) and/or a connected car (e.g., UE $102_N$), the devices can be twinned to the user's primary UE $102_1$ for a defined time period and accordingly, network usage charges associated with the temporarily utilized devices can be provided to the user in a common bill.

Figure 7:
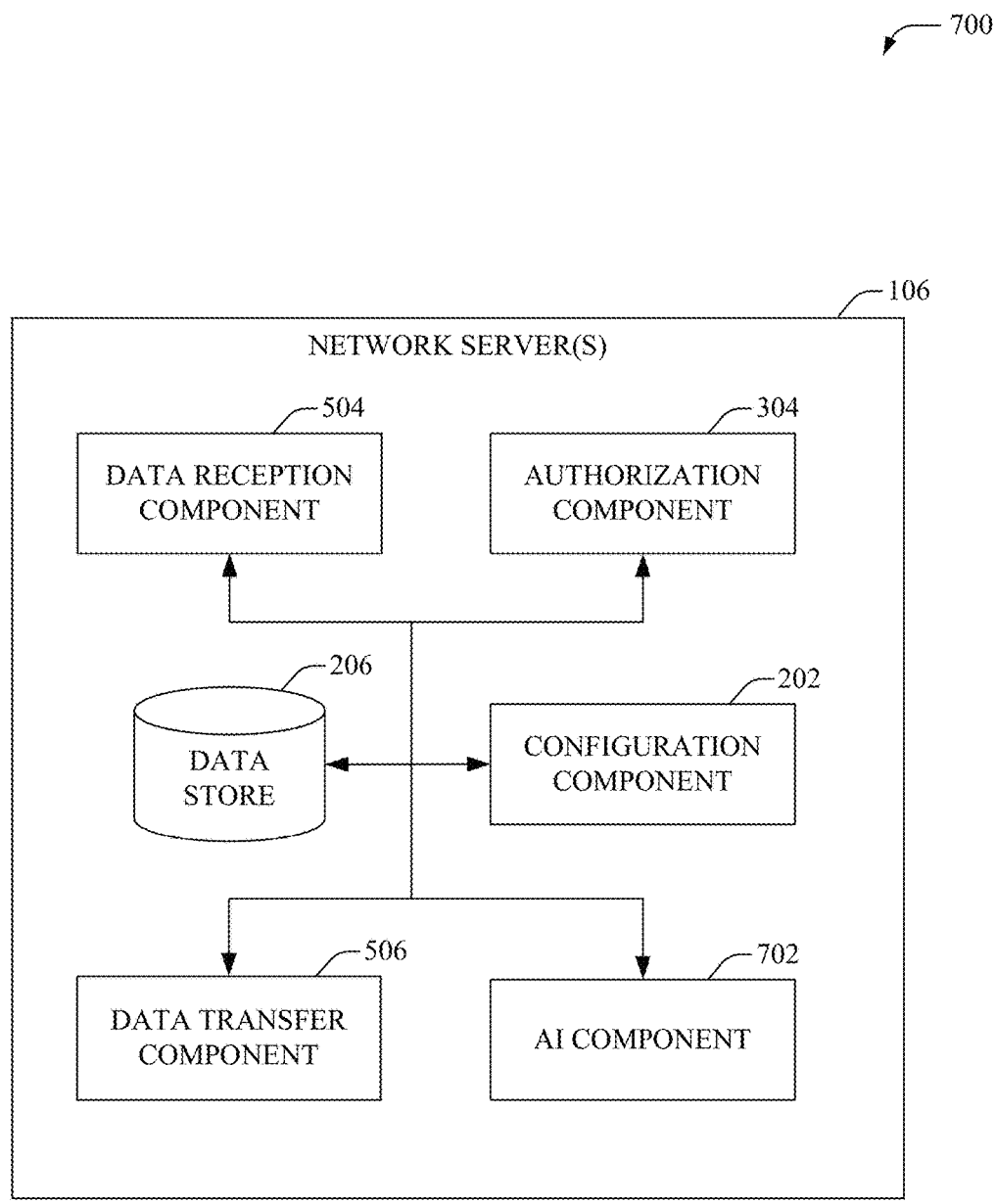
FIG. 7 illustrates an example system that facilitates automating one or more features in accordance with the subject embodiments.

FIG. 7 illustrates an example system 700 that employs one or more artificial intelligence (AI) components (702), which facilitate automating one or more features in accordance with the subject embodiments. It can be appreciated that the configuration component 202, the data store 206, the authorization component 304, the data reception component 504, and the data transfer component 506 can include respective functionality, as more fully described herein, for example, with regard to systems 100-600. In an example embodiment, system 700 (e.g., in connection with automatically twinning multiple devices) can employ various AI-based schemes for carrying out various aspects thereof. For example, a process for determining an when to twin two or more devices, when to un-twin the two or more devices, an identifier (e.g., CTN and/or MON) that is to be utilized during outgoing communication from the twinned devices, routing of communication data to the twinned devices, etc. can be facilitated via an automatic classifier system implemented by AI component 702.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be information received from UEs, and the classes can be categories or areas of interest (e.g., levels of priorities). A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As will be readily appreciated from the subject specification, an example embodiment can employ classifiers that are explicitly trained (e.g., via a generic training data) as well as implicitly trained (e.g., via observing access point/UE behavior, user/operator preferences or policies, historical information, receiving extrinsic data, mobility performance data, etc.). For example, SVMs can be configured via a learning or training phase within a classifier constructor and feature selection module. Thus, the classifier(s) of AI component 702 can be used to automatically learn and perform a number of functions, including but not limited to determining according to a predetermined criteria when two or more devices are to be twinned/un-twinned, a time period during which the two or more devices are twinned, a common identifier (e.g., CTN and/or MON) that is to be utilized during outgoing communication from the twinned devices, routing of communication data to the twinned devices, etc. The criteria can include, but is not limited to, historical patterns and/or trends, user preferences, service provider preferences and/or policies, location of the twinned devices, current time/day, network load/traffic, billing preferences, and the like.

Figure 8:
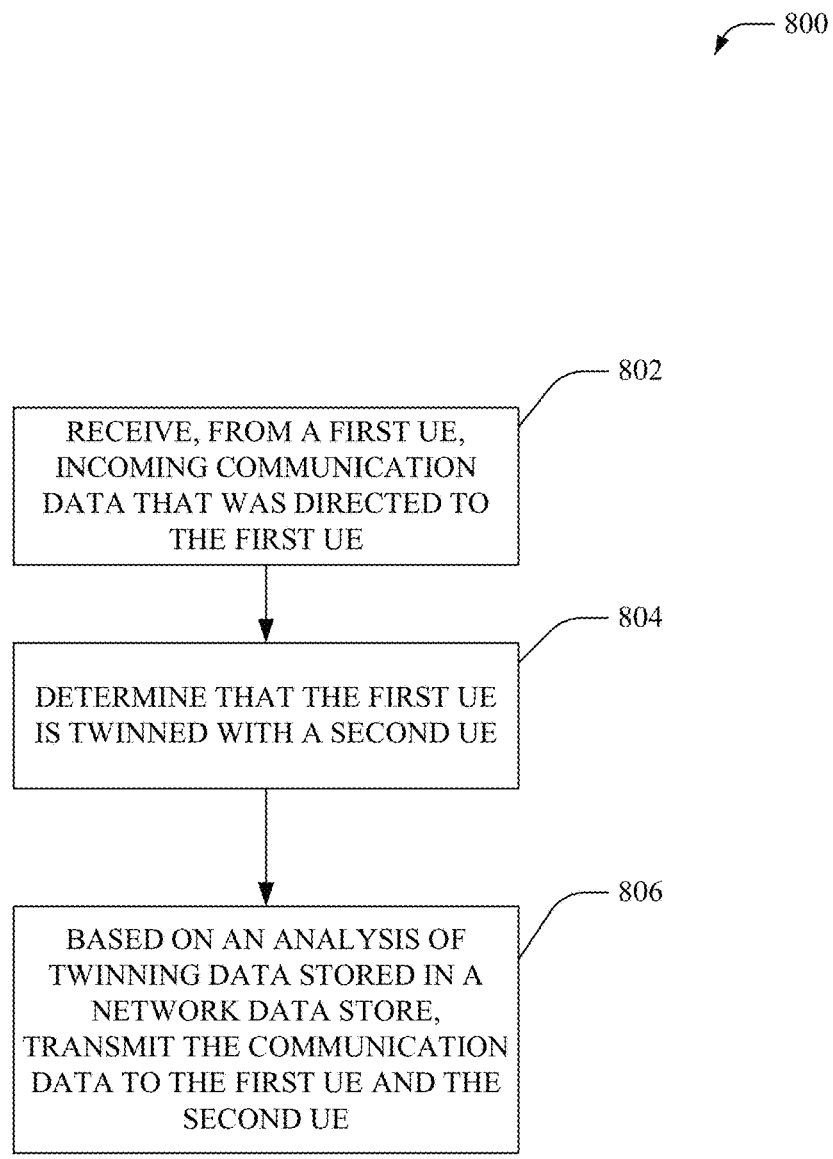
FIG. 8 illustrates an example method that facilitates routing of incoming communication data for twinned devices.
Figure 9:
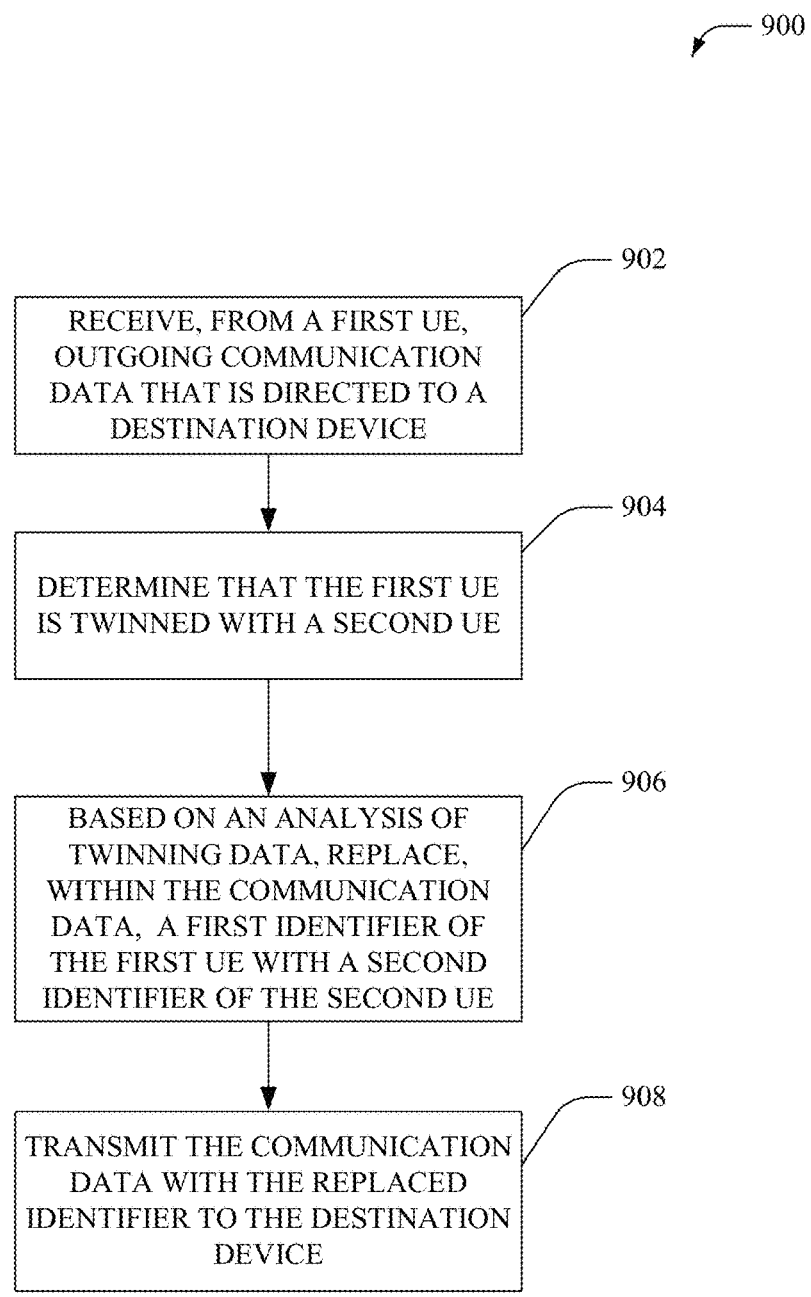
FIG. 9 illustrates an example method that facilitates routing of outgoing communication data for twinned devices.
Figure 10:
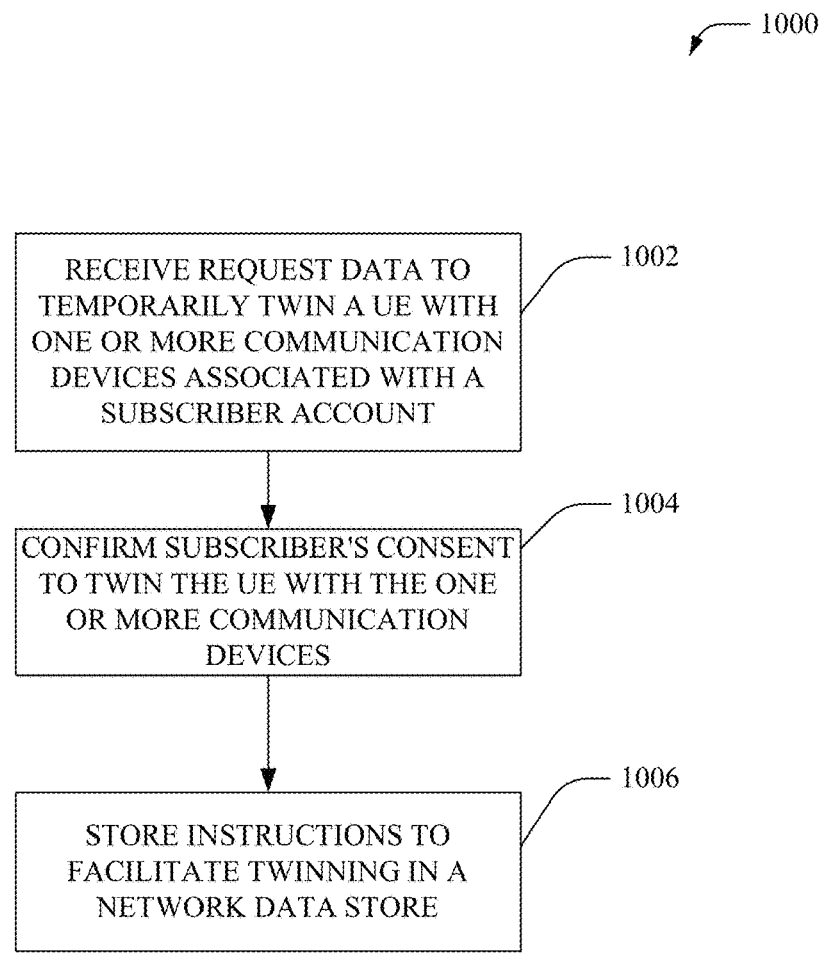
FIG. 10 illustrates an example method that facilitates configuration of temporarily twinned devices.

FIGS. 8-10 illustrate a flow diagram and/or method in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 8, illustrated is an example method 800 that facilitates routing of incoming communication data for twinned devices, according to an aspect of the subject disclosure. As an example, method 800 can be implemented by one or more network devices of a communication network (e.g., a cellular network). The twinned devices can have independent identifiers, for example, CTNs, that can be utilized by a source device to direct communication (e.g., voice/video calls, text messages, application data, etc.) to one of the twinned devices. When incoming communication is received at a first UE, a twinning application installed on the first UE can intercept the communication data and transfer the communication data to a network device (e.g., prior to presenting the communication data and/or notification of the communication data). At 802, the incoming communication data, directed to the first UE, can be received from the first UE. At 804, it can be determined that the first UE is twinned with a second UE. As an example, the twinning data can be configured by the user of the UEs (and/or lessor/renter/owner of the second UE). The twinning data can be stored in subscriber records within a network data store along with user preferences, operator preferences etc. In one example, the data stored within the network data store can be analyzed to determine routing preferences for the incoming communication data. At 806, based on an analysis of the data stored within the network data store, the communication data can be transmitted to both the first and the second UEs. Moreover, a notification for the incoming communication data can be presented on the first and the second UEs simultaneously (or substantially simultaneously).

FIG. 9 illustrates an example method 900 that facilitates routing of outgoing communication data for twinned devices, according to an aspect of the subject disclosure. As an example, method 900 can be implemented by one or more network devices of a communication network (e.g., cellular network). The twinned UEs can have independent identifiers, for example, CTNs, that can be utilized by a destination device for caller identification. When an outgoing communication is initiated by a first UE (e.g., in response to instructions received via an input interface of the first UE), a twinning application of the first UE intercepts the outgoing communication and redirects the communication data to a network device. At 902, the outgoing communication data, directed to the destination device, is receive from the first UE. At 904, it can be determined that the first UE is twinned with a second UE. As an example, the twinning data can be configured by the user of the UEs (and/or lessor/renter/owner of the second UE). The twinning data can be stored in subscriber records within a network data store along with user preferences, operator preferences etc. In one example, the data stored within the network data store can be analyzed to determine routing preferences for the incoming communication data. At 906, based on an analysis of the twinning data (and/or preferences), the first identifier (e.g., CTN) of the first UE in the communication data can be replaced with a second identifier (e.g., CTN) of the second UE. In another example, the first identifier (e.g., CTN) of the first UE can be replaced with a MON assigned to the subscriber account. At 908, the communication data, with the replaced identifier, can be transmitted to the destination device.

FIG. 10 illustrates an example method 1000 that facilitates configuration of temporarily twinned devices, according to an aspect of the subject disclosure. As an example, method 1000 can be implemented by one or more network devices of a communication network (e.g., cellular network). At 1002, request data to temporarily twin a UE with one or more communication devices associated with a subscriber account can be received. As an example, the UE can comprise most any communication device including, but not limited to connected vehicles, rental equipment, etc. Further, the UE can be rented, leased, and/or borrowed for a defined time period that can be included within the request data. At 1004, subscriber's consent to twin the UE with the one or more communication devices can be confirmed. For example, a text message (e.g., SMS message, MMS message, instant chat message, email, etc.) can be sent to the subscriber's device to confirm consent. Moreover, on receiving an acknowledgment in response to the text message, subscriber consent can be confirmed. In another example, a customer service representative can call (e.g., voice call) the subscriber to receive verbal confirmation. At 1006, instructions to facilitate twinning can be stored in a network data store, for example, within a subscriber record. Moreover, the instructions can be utilized to facilitate routing of incoming and/or outgoing communications to/from the UE and/or the one or more communication devices. In addition, the instructions can be utilized to facilitate masking of a device identifier for outgoing communications initiated by the UE. For example, the device identifier (e.g., CTN) of the UE can be replaced with a device identifier (e.g., CTN) of one of the one or more communication devices and/or a MON assigned to the subscriber account.

Figure 11:
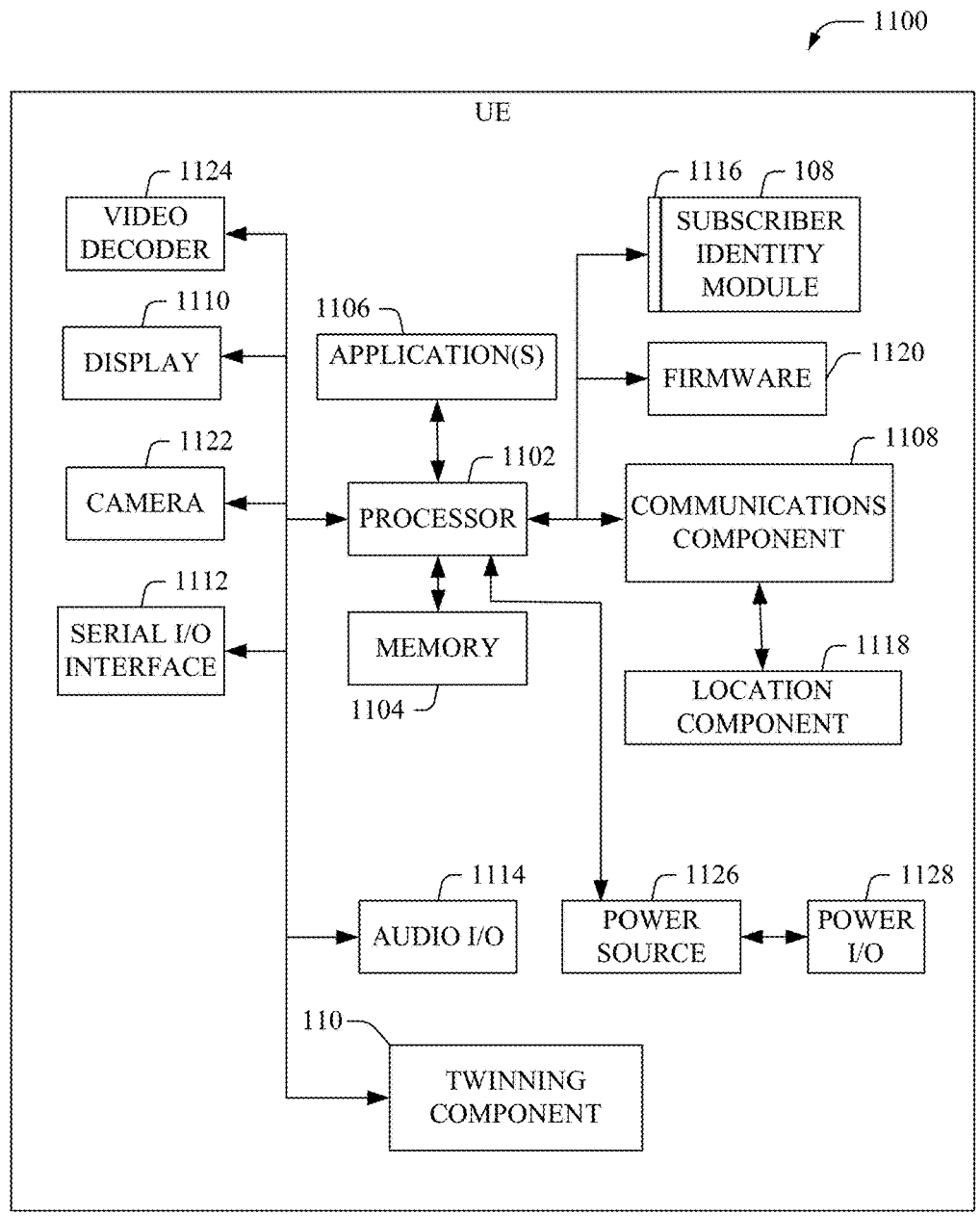
FIG. 11 illustrates an example block diagram of a user equipment suitable for cloud-based device twinning.
Figure 12:
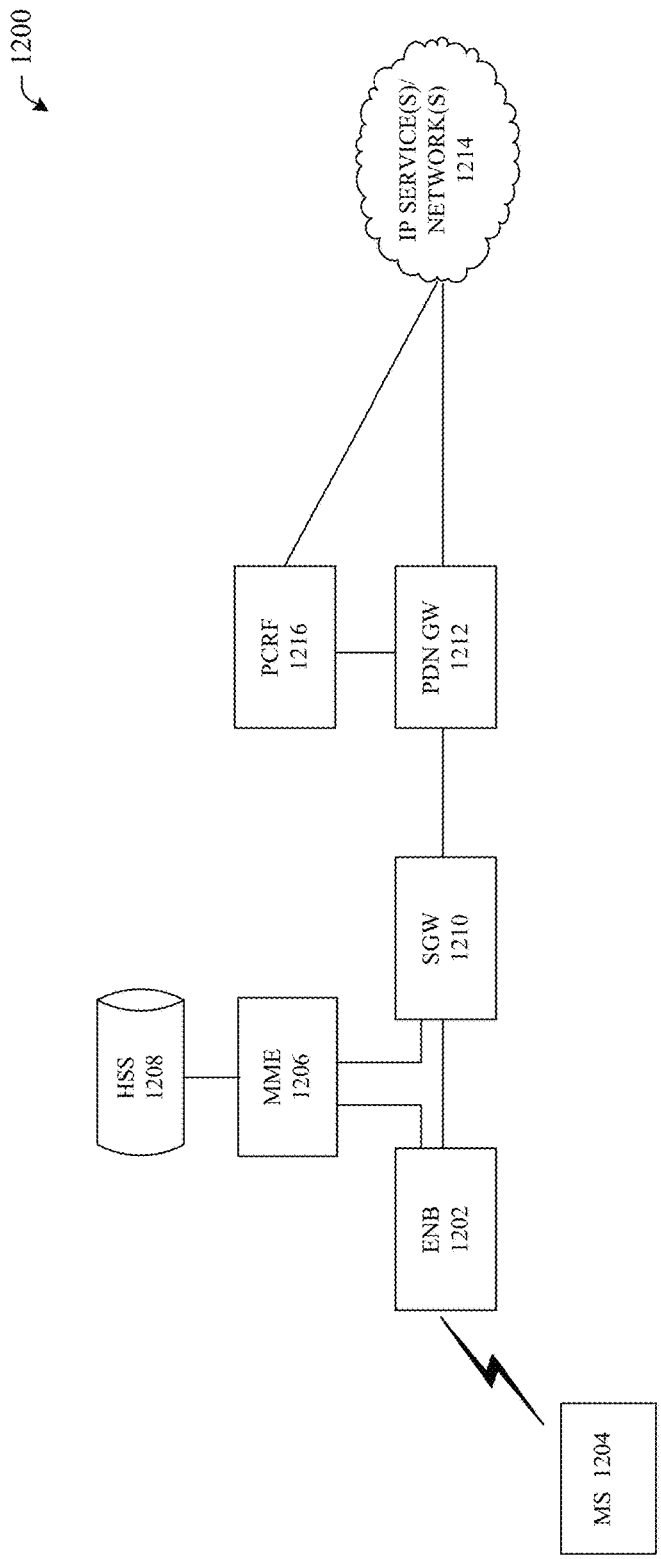
FIG. 12 illustrates a Long Term Evolution (LTE) network architecture that can employ the disclosed architecture.

To provide further context for various aspects of the subject specification, FIGS. 11 and 12 illustrate, respectively, a block diagram of an example user equipment 1100 that facilitates cloud-based device twinning and a wireless communication environment 1200, with associated components for operation and/or management of cloud-based device twinning in accordance with aspects described herein.

Referring now to FIG. 11, there is illustrated a block diagram of a UE 1100 that facilitates cloud-based device twinning in accordance with the subject specification. Moreover, the UE 1100 can be substantially similar to and include functionality associated with UE $102_1$-$102_N$, lessee UE 306, source device 502, and/or destination device 508, described herein. In one aspect, the UE 1100 can include a processor 1102 for controlling all onboard operations and processes. A memory 1104 can interface to the processor 1102 for storage of data and one or more applications 1106 being executed by the processor 1102. A communications component 1108 can interface to the processor 1102 to facilitate wired/wireless communication with external systems (e.g., via communication network 104). The communications component 1108 can interface to a location component 1118 (e.g., GPS transceiver) that can facilitate location detection of the UE 1100.

The UE 1100 can include a display 1110 (e.g., screen and/or touch screen) for displaying received content (and/or content to be transferred) and/or for displaying text information related to operating and using the device features. A serial I/O interface 1112 is provided in communication with the processor 1102 to facilitate serial communication (e.g., USB, and/or IEEE 1394) via a hardwire connection. Audio capabilities are provided with an audio I/O component 1114, which can include a speaker for the output of audio signals related to, for example, recorded data or telephony voice data, and a microphone for inputting voice signals for recording and/or telephone conversations.

Further, the UE 1100 can include a slot interface 1116 for accommodating a subscriber identity module (SIM) 108. Moreover, the SIM 108 can be substantially similar to and include functionality associated with SIMs $108_1$-$108_N$. A unique CTN is associated with the SIM 108 that can be utilized as a device identifier for UE 1100. Firmware 1120 is also provided to store and provide to the processor 1102 startup and operational data. The UE 1100 can also include an image capture component 1122 such as a camera and/or a video decoder 1124 for decoding encoded multimedia content. Further, the UE 1100 can include a power source 1126 in the form of batteries, which power source 1126 interfaces to an external power system or charging equipment via a power I/O component 1128. In addition, the UE 1100 can include the twinning component 110, which can be stored in memory 1104 and/or implemented by an application 1106. The twinning component 110 is substantially similar to twinning components $110_1$-$110_N$, can include respective functionality, as more fully described herein, for example, with regard to systems 100 and 500.

FIG. 12 illustrates a high-level block diagram that depicts an example LTE network architecture 1200 that can employ the disclosed communication architecture. The evolved RAN for LTE consists of an eNodeB (eNB) 1202 that can facilitate connection of MS 1204 to an evolved packet core (EPC) network. In one aspect, the MS 1204 is physical equipment or Mobile Equipment (ME), such as a mobile phone or a laptop computer that is used by mobile subscribers, with a Subscriber identity Module (SIM). The SIM is associated with a CTN, an International Mobile Subscriber Identity (IMSI), IMEI, and/or MSISDN, which is a unique identifier of a subscriber. The MS 1204 includes an embedded client that receives and processes messages received by the MS 1204. As an example, the embedded client can be implemented in JAVA. It is noted that MS 1204 can be substantially similar to UEs $102_1$-$101_N$ and/or 308, and can include functionality described with respect to $104_A$-$104_D$, lessee UE 306, source device 502, destination device 508, and/or UE 1100 in systems 100, 300, 500, 600, and 1100.

The connection of the MS 1204 to the evolved packet core (EPC) network is subsequent to an authentication, for example, a SIM-based authentication between the MS 1204 and the evolved packet core (EPC) network. In one aspect, the MME 1206 provides authentication of the MS 1204 by interacting with the HSS 1208. The HSS 1208 contains a subscriber profile and keeps track of which core network node is currently handling the subscriber. It also supports subscriber authentication and authorization functions (AAA). In networks with more than one HSS 1208, a subscriber location function provides information on the HSS 1208 that contains the profile of a given subscriber.

As an example, the eNB 1202 can host a PHYsical (PHY), Medium Access Control (MAC), Radio Link Control (RLC), and Packet Data Control Protocol (PDCP) layers that include the functionality of user-plane header-compression and encryption. In addition, the eNB 1202 can implement at least in part Radio Resource Control (RRC) functionality (e.g., radio resource management, admission control, scheduling, cell information broadcast, etc.). The eNB 1202 can be coupled to a serving gateway (SGW) 1210 that facilitates routing of user data packets and serves as a local mobility anchor for data bearers when the MS 1204 moves between eNBs. In addition, the SGW 1210 can act as an anchor for mobility between LTE and other 3GPP technologies (GPRS, UMTS, etc.). When MS 1204 is in an idle state, the SGW 1210 terminates a downlink (DL) data path and triggers paging when DL data arrives for the MS 1204. Further, the SGW 1210 can perform various administrative functions in the visited network such as collecting information for charging and lawful interception.

In one aspect, the SGW 1210 can be coupled to a Packet Data Network Gateway (PDN GW) 1212 that provides connectivity between the MS 1204 and external packet data networks such as IP service(s)/network(s) 1214. Moreover, the PDN GW 1212 is a point of exit and entry of traffic for the MS 1204. It is noted that the MS 1204 can have simultaneous connectivity with more than one PDN GW (not shown) for accessing multiple PDNs.

The PDN GW 1212 performs IP address allocation for the MS 1204, as well as QoS enforcement and implements flow-based charging according to rules from a Policy Control and Charging Rules Function (PCRF) 1216. The PCRF 1216 can facilitate policy control decision-making and control flow-based charging functionalities in a Policy Control Enforcement Function (PCEF), which resides in the PDN GW 1212. The PCRF 1216 can store data (e.g., QoS class identifier and/or bit rates) that facilitates QoS authorization of data flows within the PCEF. In one aspect, the PDN GW 1212 can facilitate filtering of downlink user IP packets into the different QoS-based bearers and perform policy enforcement, packet filtering for each user, charging support, lawful interception and packet screening. Further, the PDN GW acts as the anchor for mobility between 3GPP and non-3GPP technologies such as WiMAX and 3GPP2 (CDMA 1X and EvDO). Although a LTE network architecture 1200 is described and illustrated herein, it is noted that most any communication network architecture can be utilized to implement the disclosed embodiments.

Figure 13:
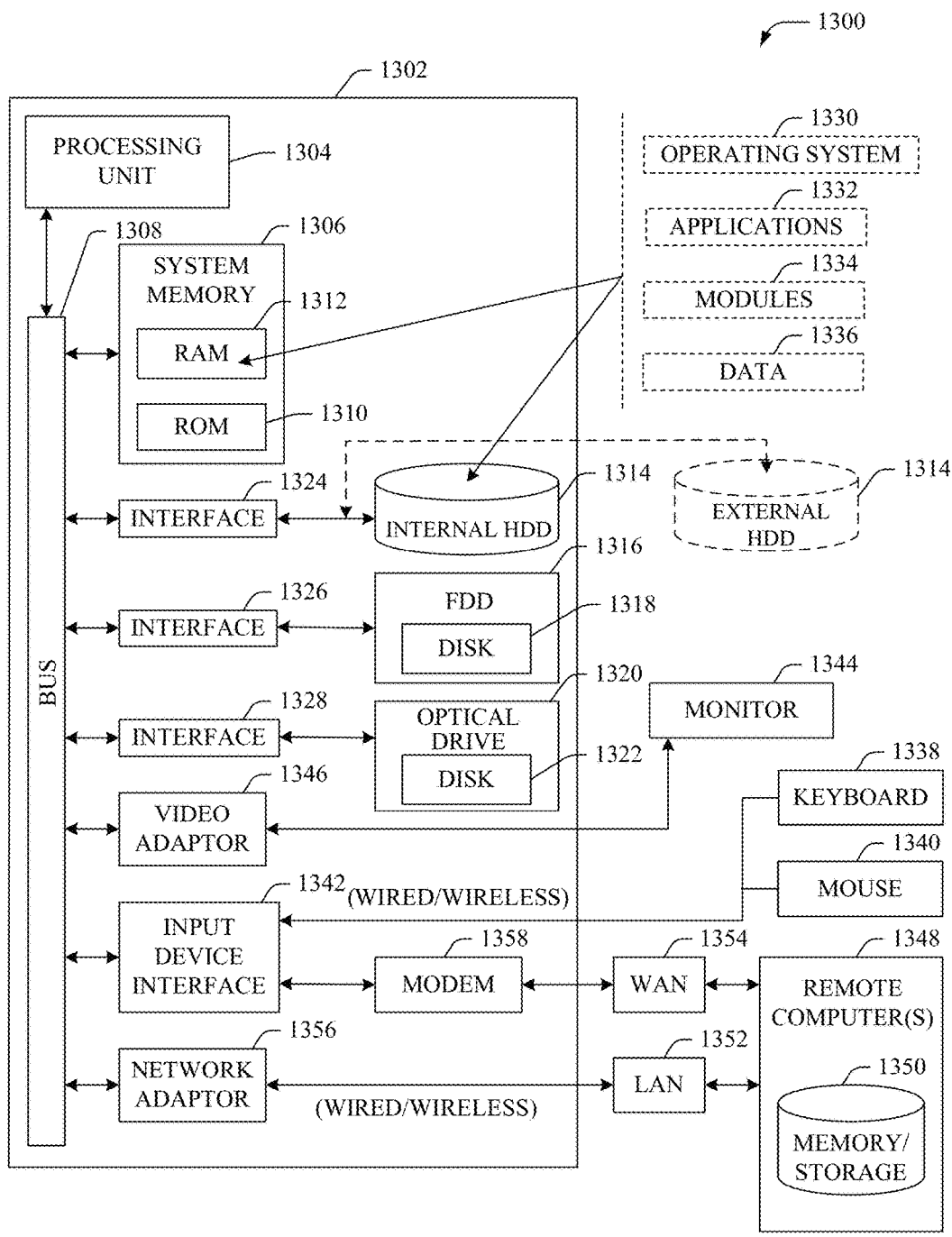
FIG. 13 illustrates a block diagram of a computer operable to execute the disclosed communication architecture.

Referring now to FIG. 13, there is illustrated a block diagram of a computer 1302 operable to execute the disclosed communication architecture. In order to provide additional context for various aspects of the disclosed subject matter, FIG. 13 and the following discussion are intended to provide a brief, general description of a suitable computing environment 1300 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 13, the example environment 1300 for implementing various aspects of the specification includes a computer 1302, the computer 1302 including a processing unit 1304, a system memory 1306 and a system bus 1308. As an example, the component(s), server(s), equipment, system(s), and/or device(s) (e.g., UEs $102_1$-$102_N$, network server(s) 106, SIMs $108_1$-$108_N$, twinning component $110_1$-$110_N$, configuration component 202, authorization component 304, lessee UE 306, source device 502, data reception component 504, data transfer component 506, destination device 508, billing component 602, AI component 702, UE 1100, MS 1204, eNB 1202, MME 1206, SGW 1210, PDN GW 1212, PCRF 1216, etc.) disclosed herein with respect to system 100-300, 500-700, and 1100-1200 can each include at least a portion of the computer 1302. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314, which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the specification can be implemented with various commercially available operating systems or combinations of operating systems.

A user can enter commands and information into the computer 1302 through one or more wired/wireless input devices, e.g., a keyboard 1338 and/or a pointing device, such as a mouse 1340 or a touchscreen or touchpad (not illustrated). These and other input devices are often connected to the processing unit 1304 through an input device interface 1342 that is coupled to the system bus 1308, but can be connected by other interfaces, such as a parallel port, an IEEE 1394 serial port, a game port, a USB port, an infrared (IR) interface, etc. A monitor 1344 or other type of display device is also connected to the system bus 1308 via an interface, such as a video adapter 1346.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 is connected to the local network 1352 through a wired and/or wireless communication network interface or adapter 1356. The adapter 1356 can facilitate wired or wireless communication to the LAN 1352, which can also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are example and other means of establishing a communications link between the computers can be used.

The computer 1302 is operable to communicate with any wireless devices or entities operatively disposed in wireless communication, e.g., desktop and/or portable computer, server, communications satellite, etc. This includes at least WiFi and Bluetooth® wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at an 54 Mbps (802.11a) data rate, and/or a 2.4 GHz radio band at an 11 Mbps (802.11b), an 54 Mbps (802.11g) data rate, or up to an 600 Mbps (802.11n) data rate for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A system, comprising:
  a processor; and
  a memory that stores executable instructions that, when executed by the processor, facilitate performance of operations, comprising:
    receiving communication data that is directed to a destination device, wherein the communication data comprises first identifier data representing a first user equipment,
    based on information accessed from a network data store of a communication network, determining that the first identifier data has been linked to second identifier data representing a second user equipment, and
    in response to the determining, replacing, within the communication data, the first identifier data with the second identifier data to generate updated communication data that is to be directed to the destination device.

2. The system of claim 1, wherein the first user equipment comprises a device that has been leased by a subscriber identity associated with the second user equipment.

3. The system of claim 1, wherein the first user equipment comprises a device of a vehicle coupled to a network device of the communication network.

4. The system of claim 1, wherein the operations further comprise:
  facilitating a transmission of the updated communication data to the destination device via a network device of the communication network.

5. The system of claim 1, wherein the second identifier data is indicative of a customer telephone number.

6. The system of claim 1, wherein the operations further comprise:
  receiving instruction data indicative of an instruction to link the first user equipment to the second user equipment.

7. The system of claim 6, wherein the operations further comprise:
  receiving timing data indicative of a time period during which the first user equipment and the second user equipment are to be linked.

8. The system of claim 7, wherein the operations further comprise:
  in response to determining that the timing data satisfies an expiration criterion, unlinking the first user equipment and the second user equipment.

9. The system of claim 6, wherein the operations further comprise:
  in response to receiving, from the second user equipment, authorization data indicative of an authorization to link the first user equipment with the second user equipment, facilitating the linking of the first identifier data to the second identifier data.

10. The system of claim 9, wherein the authorization data is received via a text message.

11. A method, comprising:
  linking, by a system comprising a processor, identifiers of communication devices associated with a common subscriber identity;
  based on input data, selecting, by the system, a primary identifier of the identifiers; and
  in response to receiving, from a secondary communication device of the communication devices, communication data, comprising a secondary identifier of the identifiers and that is directed to a destination device, replacing, by the system, the secondary identifier with the primary identifier to generate modified communication data that is to be directed to the destination device.

12. The method of claim 11, further comprising:
receiving, by the system, timing data indicative of a time period during which the identifiers are to be linked, wherein the linking comprises linking the identifiers during the time period.

13. The method of claim 12, wherein the receiving the timing data comprises receiving the timing data indicative of the time period for which the secondary communication device has been leased.

14. The method of claim 11, further comprising:
receiving, by the system, input data indicative of an instruction to delink the identifiers; and
in response to the receiving the input data, delinking the identifiers.

15. The method of claim 14, wherein the communication data is first communication data, the destination device is a first destination device, and the method further comprises:
subsequent to the delinking and in response to the receiving, from the secondary communication device, second communication data that comprises the secondary identifier and that is directed to a second destination device, facilitating, by the system, a transmission of the second communication data to the second destination device.

16. The method of claim 11, wherein the linking comprises linking customer telephone numbers of the communication devices.

17. A non-transitory machine-readable storage medium comprising executable instructions that, when executed by a processor facilitate performance of operations, comprising:
based on receiving input data, associating communication devices that are related to a common subscriber identity;
determining a primary identifier associated with the common subscriber identity; and
in response to receiving, from a source communication device of the communication devices, communication data that comprises a source identifier indicative of the source communication device and that is directed to a destination device, replacing the source identifier with the primary identifier to generate modified communication data that is to be provided to the destination device.

18. The non-transitory machine-readable storage medium of claim 17, wherein the associating comprises storing, within a network data store, association data indicative of association between identifiers of the communication devices.

19. The non-transitory machine-readable storage medium of claim 17, wherein the associating comprises associating the communication devices during a time period that is determined to satisfy a defined timing criterion.

20. The non-transitory machine-readable storage medium of claim 17, wherein the source communication device comprises a device that is rented for a defined time period.

* * * * *